(12) United States Patent
Sharpes

(10) Patent No.: US 10,499,703 B2
(45) Date of Patent: Dec. 10, 2019

(54) SHOE INSOLE AND GENERATOR

(71) Applicant: The Government of the United States, as represented by the Secretary of the Army, Washington, DC (US)

(72) Inventor: Nathan Sharpes, Abingdon, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 176 days.

(21) Appl. No.: 15/827,442

(22) Filed: Nov. 30, 2017

(65) Prior Publication Data

US 2019/0159543 A1    May 30, 2019

(51) Int. Cl.
| | | |
|---|---|---|
| *H02K 7/18* | (2006.01) | |
| *H02K 7/06* | (2006.01) | |
| *F16H 19/04* | (2006.01) | |
| *A43B 3/00* | (2006.01) | |
| *A43B 17/06* | (2006.01) | |

(52) U.S. Cl.
CPC ......... *A43B 3/0015* (2013.01); *H02K 7/1853* (2013.01); *A43B 17/06* (2013.01); *F16H 19/04* (2013.01); *H02K 7/06* (2013.01)

(58) Field of Classification Search
USPC ............... 290/1 C, 1 R; 36/2.6; 320/107
See application file for complete search history.

(56) References Cited

U.S. PATENT DOCUMENTS

| | | | | |
|---|---|---|---|---|
| 1,272,931 | A * | 7/1918 | Etheridge | A43B 7/02 36/2.6 |
| 1,506,282 | A * | 8/1924 | Barbieri | A43B 3/0005 310/75 B |
| 2,973,658 | A | 3/1961 | Bishop | |
| 3,001,117 | A * | 9/1961 | Sikorra | H02K 24/00 318/618 |
| 3,064,491 | A | 11/1962 | Bishop | |
| 3,378,756 | A * | 4/1968 | Potter | H02P 9/42 322/32 |
| 3,908,479 | A | 9/1975 | MacDuff | |
| 4,444,070 | A | 4/1984 | Yanai | |
| 4,475,413 | A | 10/1984 | Higuchi | |
| 4,674,199 | A * | 6/1987 | Lakic | A43B 1/0054 219/211 |
| 4,782,602 | A * | 11/1988 | Lakic | A41D 19/001 219/211 |
| 4,845,338 | A * | 7/1989 | Lakic | A41D 19/001 219/211 |
| 5,495,682 | A * | 3/1996 | Chen | A43B 3/0005 219/211 |
| 6,255,799 | B1 * | 7/2001 | Le | A43B 3/00 219/211 |

(Continued)

Primary Examiner — Pedro J Cuevas
(74) Attorney, Agent, or Firm — Ronald Krosky; Azza Jayaprakash

(57) ABSTRACT

Linear movement of a heel strike sequence for a shoe insole can be converted into rotational movement. This rotational movement can cause rotation of an interior of a generator. Rotation of this interior of the generator can cause an electricity to be generated and outputted. The generator can be considered a source of damping, so at the start of the heel strike sequence the generator can be non-engaged. After some time, the generator can be engaged and in turn rotate. This can allow for standing inertia to be more quickly overcome.

20 Claims, 15 Drawing Sheets

(56) References Cited

U.S. PATENT DOCUMENTS

| | | | |
|---|---|---|---|
| 6,744,145 B2 * | 6/2004 | Chang | A43B 3/0005 |
| | | | 219/211 |
| 6,982,497 B2 * | 1/2006 | Rome | A45F 3/08 |
| | | | 224/579 |
| 7,391,123 B2 * | 6/2008 | Rome | A45F 3/08 |
| | | | 224/604 |
| 7,699,499 B2 * | 4/2010 | Liao | A43B 1/0054 |
| | | | 362/192 |
| 7,956,476 B2 * | 6/2011 | Yang | A43B 3/00 |
| | | | 290/1 R |
| 7,956,753 B2 * | 6/2011 | Fogg | G08B 21/22 |
| | | | 340/573.1 |
| 8,564,144 B1 * | 10/2013 | Rome | A45F 4/02 |
| | | | 290/1 C |
| 8,970,054 B2 | 3/2015 | Stanton et al. | |
| 9,190,886 B2 | 11/2015 | Stanton et al. | |
| 9,498,017 B2 * | 11/2016 | Lin | F03G 5/06 |
| 9,716,419 B2 * | 7/2017 | Stanton | H02K 7/1861 |
| 2004/0183306 A1 * | 9/2004 | Rome | A45F 3/08 |
| | | | 290/1 R |
| 2006/0192386 A1 * | 8/2006 | Rome | A45F 3/08 |
| | | | 290/1 R |
| 2008/0257085 A1 | 10/2008 | Bless et al. | |
| 2013/0219743 A1 * | 8/2013 | Ye | A43B 3/0015 |
| | | | 36/2.6 |
| 2014/0368157 A1 | 12/2014 | Alexander et al. | |
| 2015/0059204 A1 | 3/2015 | Alexander et al. | |
| 2019/0162277 A1 * | 5/2019 | Sharpes | F16H 19/043 |

* cited by examiner

SHOE INSOLE AND GENERATOR

GOVERNMENT INTEREST

The innovation described herein may be manufactured, used, imported, sold, and licensed by or for the Government of the United States of America without the payment of any royalty thereon or therefor.

BACKGROUND

Electronic devices have a wide variety of uses and applications in modern society. These electronic devices use electrical energy to function. In one example, this energy is derived from a battery. As the devices are used, the battery level lowers and ultimately reaches a level so low that the electronic device does not function without a new battery, which can be expensive, or the battery being recharged. Therefore, it can be valuable to recharge a battery.

SUMMARY

In one embodiment, a system can comprise a conversion component and an engagement component. The conversion component can be hardware and can be configured to convert a force of heel strike sequence on a shoe insole into a rotational motion of a rotational mechanism. The engagement component can be hardware and can be configured to engage the rotational mechanism with an electrical generator such that the electrical generator experiences rotation from the rotational motion of the mechanism. Engagement of the mechanism can occur after a start of the heel strike step sequence and before an end of the heel strike step sequence.

In another embodiment, a shoe insole can comprise a linear movement mechanism that can be configured to make a linear movement from a neutral position to an off-neutral position during a heel strike sequence. The shoe insole can also comprise a rotational movement mechanism that can be coupled to the linear movement mechanism and can be configured to make a rotational movement in response to the linear movement. The rotational movement can cause a rotation of an electrical generator during less than a full duration of the heel strike sequence.

In yet another embodiment, a method can be performed by a shoe mechanism. The method can comprise experiencing a linear energy that is resultant from a heel strike. The method can also comprise using the linear energy to rotate a rotational mechanism over a first time frame and a second time frame. The second time frame can follow the first time frame without overlap. During the first time frame the rotational mechanism can be configured to not spin an electrical generator. During the second time frame the rotational mechanism can be configured to spin the electrical generator.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
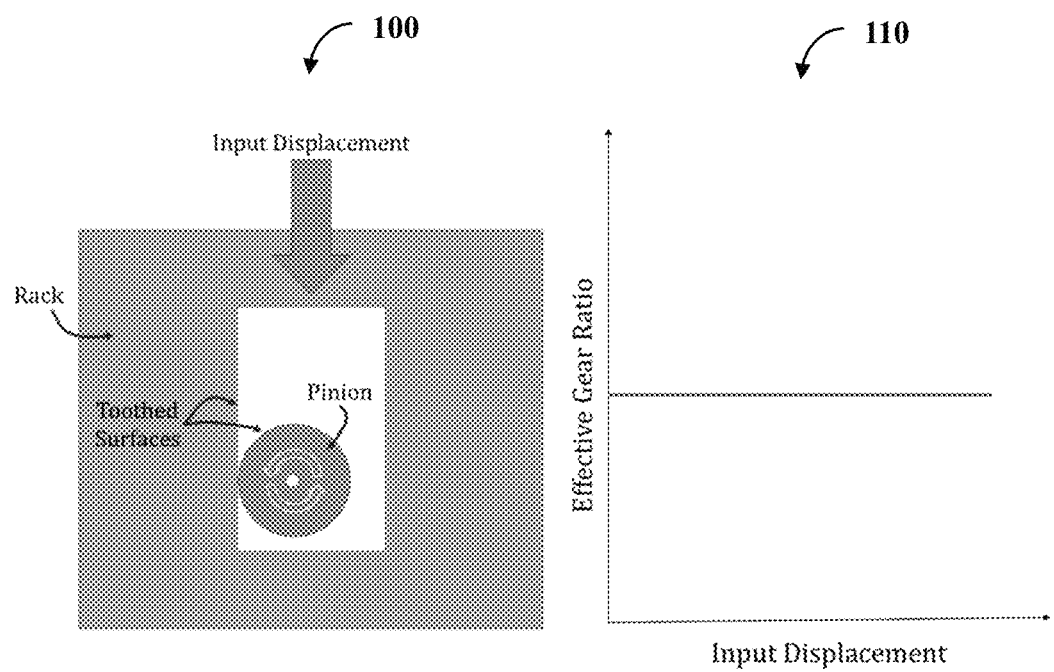
FIG. 1 illustrates one embodiment of a system and a graph.

A person can wear a shoe, such as a combat boot, with an energy harvester. As an example, the energy harvester can be part of an insole. This energy harvester can convert movement from a heel strike into rotational movement. This rotational movement can cause an interior of an electrical generator to rotate. This interior rotation can cause an electricity to be produced. This electricity can be used to charge a battery.

The conversion of the heel strike to rotational movement to ultimately produce the energy can occur by way of a rack and pinion system. The rack and a pinion gear can be inline with one another. As the rack moves, the pinion gear rotates. The pinion gear can have a variable gear ratio so that the gear ratio is lower at a start to overcome initial resting inertia and increase so the gear ratio is higher toward an end of rotation to increase (e.g., maximize) rotation speed.

Since there is the initial resting inertia to overcome, the insole can include an electrical clutch. Example electrical clutches can include a button/switch or a potentiometer. This way the electrical generator is not engaged throughout the rotation, but instead during a later phase of rotation. With this, more energy can be dedicated with overcoming inertia at a start of the rotation while more energy can be dedicated toward generation rotation at an end of the rotation.

The insole can also include a mechanical clutch, such as a ratchet mechanism. With the mechanical clutch, the electrical generator can over-run or spin faster than an input gear train. With this, the electrical generator can continue to rotate after a heel strike is completed, allowing more electricity to be produced. Additionally, the mechanical clutch can allow the insole to reset quickly to a pre-heel strike state.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 and a graph 110. With the system, a rack can have a toothed surface that engages with a toothed surface of a pinion (the toothed surface making the pinion into a pinion gear). Therefore, the pinion is physically coupled to the rack by this toothed engagement. The rack and pinion can be inline meaning that they occupy about the same plane. When the rack moves laterally, such as in response to the input displacement, the pinion gear experiences a rotation.

With FIG. 1, the pinion is round and therefore has a fixed gear ratio. Therefore, the gear ratio does not change wherever the rack is translated from the input displacement. This lack of change is illustrated in the graph 110.

Figure 2:
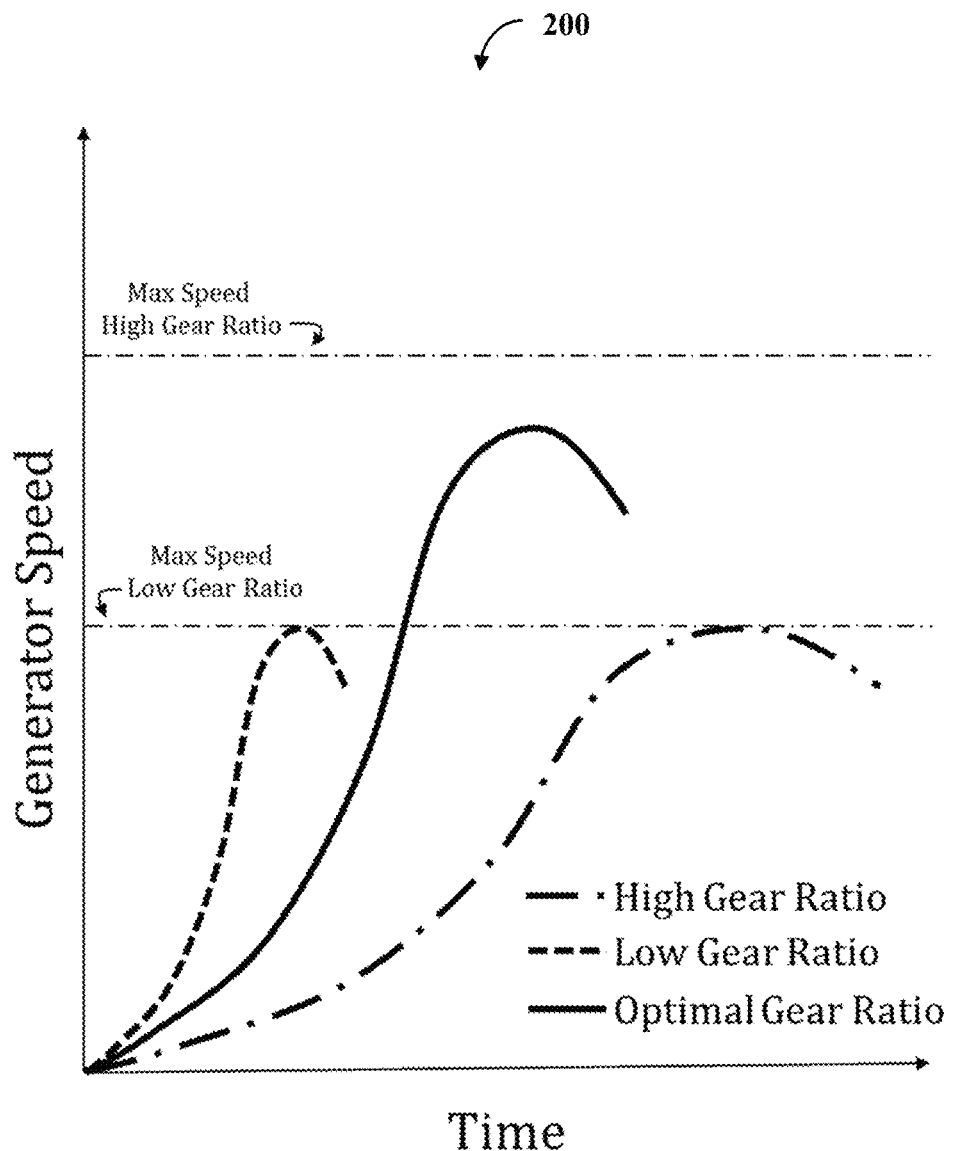
FIG. 2 illustrates one embodiment of a graph of generator speed versus time.

FIG. 2 illustrates one embodiment of a graph 200 of generator speed versus time. The pinion from FIG. 1 can be coupled to an electrical generator. As the pinion rotates, an interior portion of the electrical generator can rotate to cause an electricity to be produced. The graph 200 illustrates several options for the gear ratio—a low gear ratio, a high gear ratio, and an optimal gear ratio.

For a gear ratio, there is an initial inertia to be overcome. A basic concept is that it takes more force to move the rack from a standstill than when already in motion. Depending on the gear ratio chosen, the initial force required to move the rack will be different.

With the low gear ratio, the initial force required to move the rack would be lower and therefore take less time. Less time dedicated to initially moving the rack and pinion would lead to the generator reaching maximum achievable speed. However, this gear ratio would limit a final achievable speed of the pinion and in turn lead to lower generator speed. The lower the generator speed, the less electricity that is produced.

A high gear ratio would allow for the generator to spin the fastest. However, the initial force to move the rack would be greater and therefore take more time. Due to the limited physical range in the rack, the pinion cannot rotate enough for the maximum speed to be achieved. What this means in practical terms is that the high gear ratio is of little value in that the maximum speed is not obtainable in view of physical limitations of the rack and pinion gear.

Therefore, an optimal gear ratio would allow for a balance between generator speed and initial force required to move the rack and spin the pinion. This would allow for the generator to spin faster than the high or low ratio. In addition, the maximum spinning could be for a longer duration. This ultimately allows for more electricity to be produced from the same input displacement discussed with FIG. 1.

Figure 3:
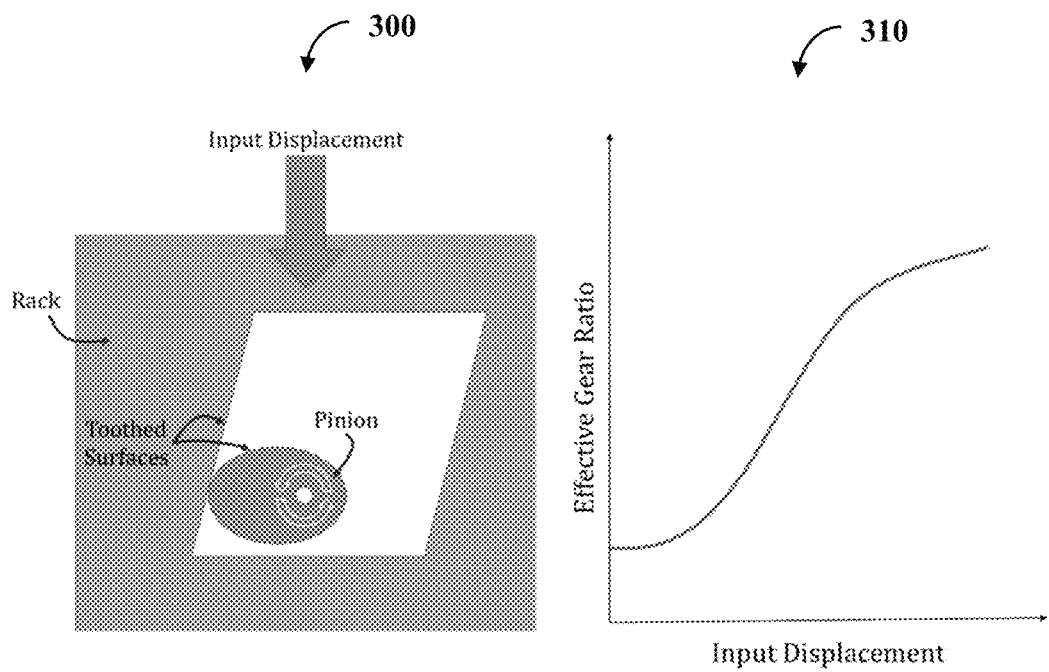
FIG. 3 illustrates one embodiment of a system and a graph.

FIG. 3 illustrates one embodiment of a system 300 and a graph 310. The system 300 has a rack and pinion with toothed surfaces. The rack moves from an input displacement. However, as opposed to the system 100 of FIG. 1, the pinion can have a varied gear ratio. With this, the pinion is not circular, but of a non-circular shape to facilitate the varied gear nature. As illustrated with the system 300, the pinion is an oval. The pinion, as shown by the white circle, can be coupled to the electrical generator by way of a coupling mechanism (e.g., a screw). As illustrated, the pinion can be coupled to the coupling mechanism outside a center of the pinion.

The graph 310 illustrates the effective gear ratio of the pinion as the pinion rotates. In other words, the gear ratio that engages with the pinion. As the initial displacement becomes greater (the rack moves more), the gear ratio increases. With the system 300, the change of gear ratio is not constant. With this, the pinion has a larger start radius and a smaller end radius.

Figure 4:
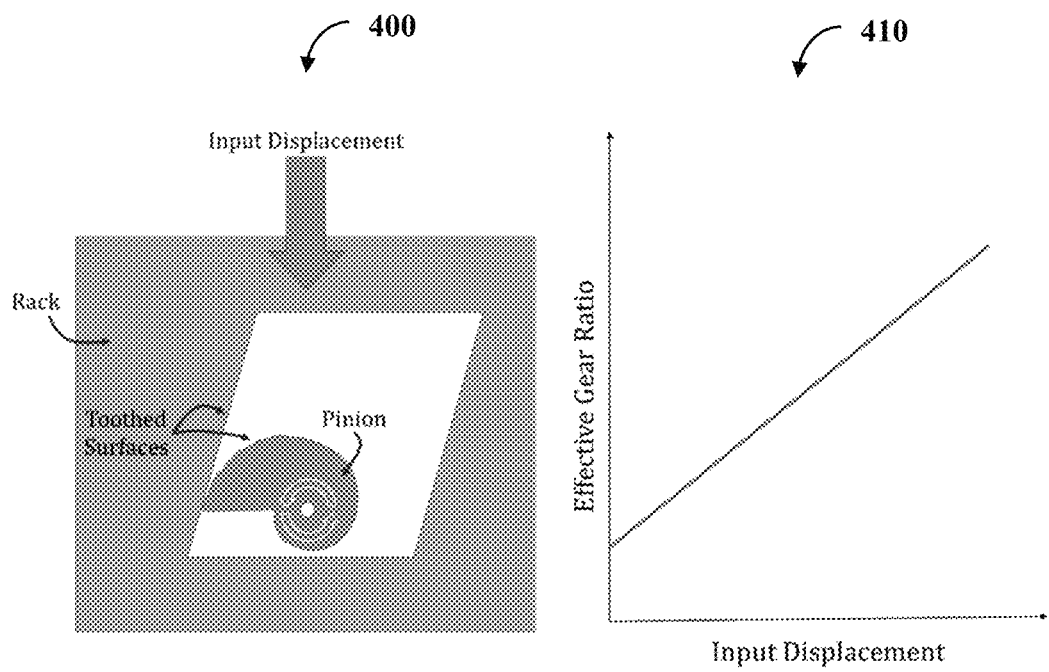
FIG. 4 illustrates one embodiment of a system and a graph.

FIG. 4 illustrates one embodiment of a system 400 and a graph 410. The system 400 has a rack and pinion with toothed surfaces. The rack moves from an input displacement. Here, the pinion has a varied gear ratio as with the system 300 of FIG. 3, but is configured in a different manner. The pinion is spiral shaped and provides a gradual and constant change for the gear ratio against the input displacement that is illustrated in the graph 410.

Figure 5:
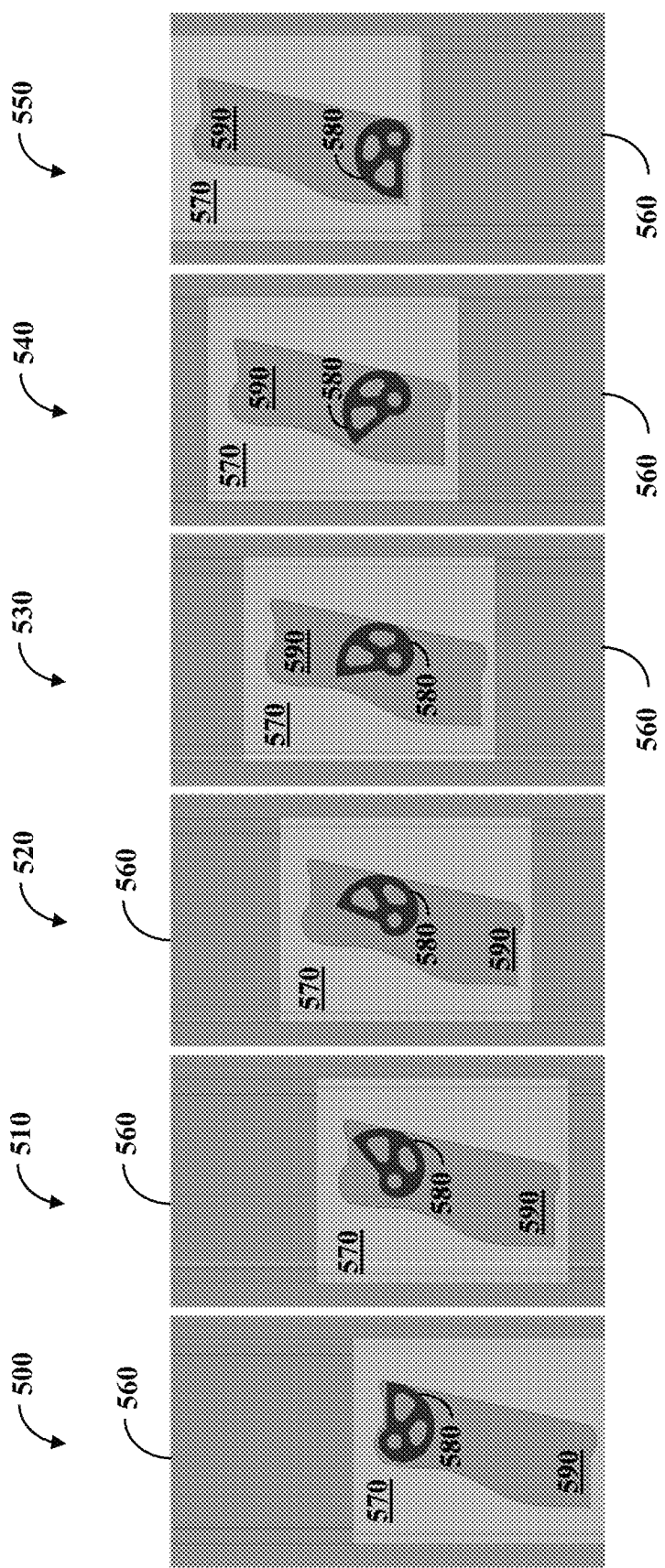
FIG. 5 illustrates one embodiment of a system in a motion sequence with six phases.

FIG. 5 illustrates one embodiment of a sequence of a shoe insole 560 with six phases 500-550. The sequence shows a rack 570 at different points and how a pinion gear 580 moves in its rotation. The rack has an open space 590 custom designed for the rack 570 so that the pinion gear 580 can freely move, yet the rack 570 can have a maximum amount of physical support.

From 500-550 can be considered a sequence during a heel strike while from 550-500 can be considered a sequence during a heel lift. At 500, the rack 570 can be at a heel-side position. When a user steps down, the rack 570 moves from the heel-side position (posterior) to a toe-side position (anterior) that can be seen in 550. When the user lifts a foot after the step down, the rack 570 moves from the toe-side position to the heel-side position, 550 to 500, and ready for a next step. In an alternative embodiment, the opposite can occur such that the heel strike causes the rack to move from toe to heel and the heel lift moves from heel to toe.

Figure 6:
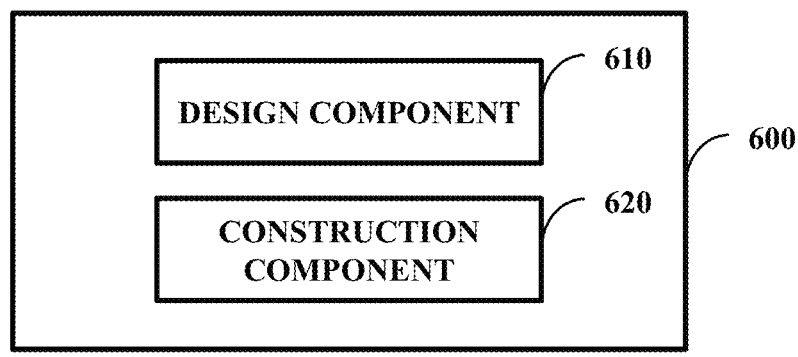
FIG. 6 illustrates one embodiment of a system comprising a design component and a construction component.

FIG. 6 illustrates one embodiment of a system 600 comprising a design component 610 and a construction component 620. The system 600 can manufacture at least part of the shoe insole 560 of FIG. 5. In one example, a user can enter parameter information, such as shoe size (the larger the shoe size, the more available area). Based on the parameter information, the design component 610 can design a shape of the open area 590. This shape can allow for complete desired rotation of the pinion 580 of FIG. 5 without obstruction from the rack 570 of FIG. 5, yet minimize an amount removed from the rack 570 of FIG. 5 so the rack 570 of FIG. 5 has maximum structural support or meets a minimal structural support threshold. The design component 610 can transfer the design to the construction component 620 and based on the design the construction component 620 can construct the rack 570 of FIG. 5 (e.g., hollow out the open area 590 of FIG. 5 through laser cutting), build the pinion gear 580 of FIG. 5 to fit in an opening (e.g., through three-dimensional printing), and/or construct the shoe insole 560 of FIG. 5/a shoe with the shoe insole 560 of FIG. 5. From this, the construction component 620 can output the shoe insole 560 of FIG. 5 or the shoe.

Figure 7:
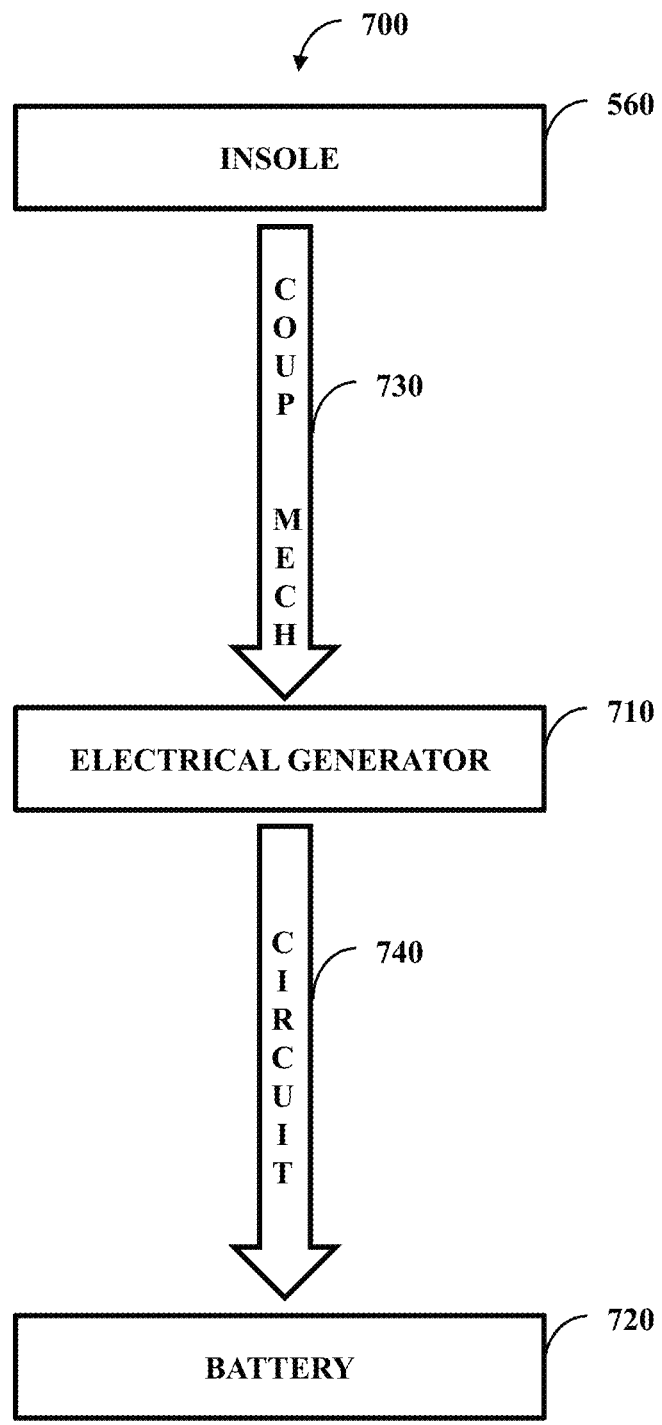
FIG. 7 illustrates one embodiment of a system comprising the insole, an electrical generator, and a battery.

FIG. 7 illustrates one embodiment of a system 700 comprising the insole 560, an electrical generator 710, and a battery 720. While shown as separate and distinct, the electrical generator 710 and/or the battery 720 can be part of the insole 560. A coupling mechanism 730 can couple the pinion gear 580 of FIG. 5 with the electrical generator 710 such that when the pinion gear 580 of FIG. 5 experiences a rotation, the coupling mechanism 730 experiences a rotation. The rotation of the coupling mechanism 730 can cause rotation of at least part of the electrical generator 710 such that the electrical generator produces an electricity. The electricity can be transferred to the battery 720, such as by way of a circuit 740 or wireless transfer.

Discussed above is a heel-side position to a toe-side position movement responding to a heel strike and a toe-side position to a heel-side position movement responding to a heel lift. The coupling mechanism 730 can function with a ratchet. The ratchet can cause the coupling mechanism 730 to engage with the electrical generator 710 and/or the insole 560 during the heel strike and not engage during the heel lift. This way, the electrical generator 710 spins in one direction and not an opposite direction.

Figure 8:
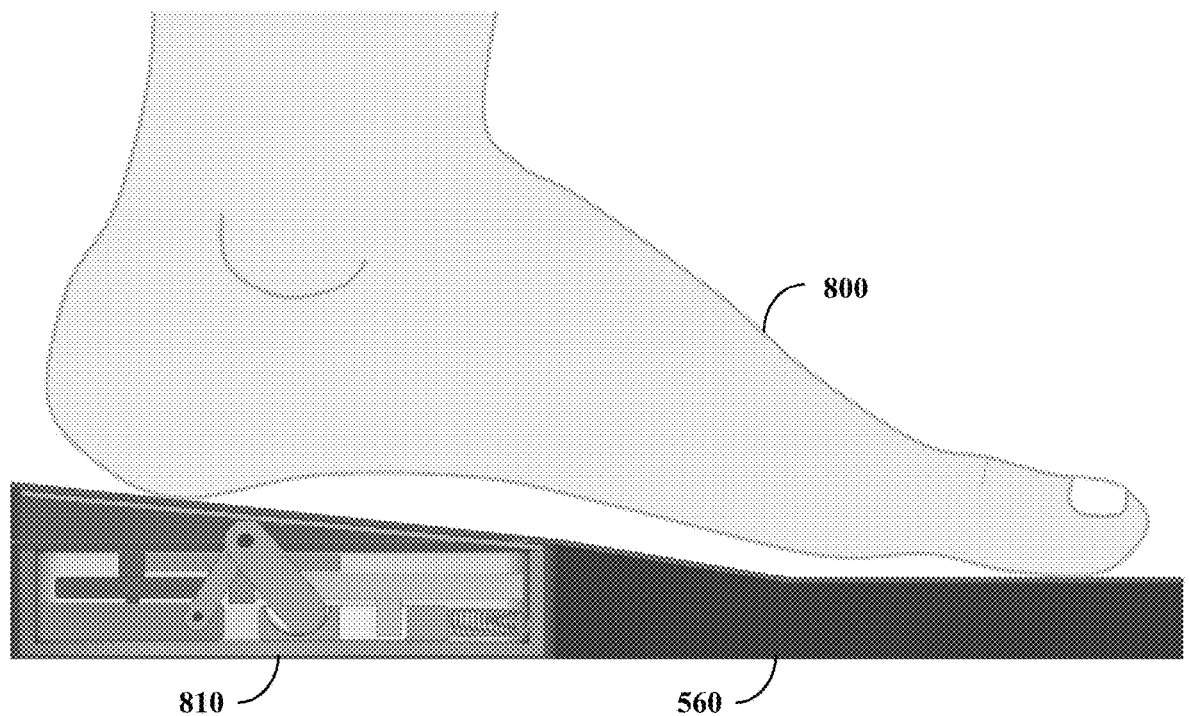
FIG. 8 illustrates one embodiment of a foot and the insole with a mechanical portion.

FIG. 8 illustrates one embodiment of a foot 800 and the insole 560 with a mechanical portion 810. The foot 800 is in position before a heel strike and/or after a heel lift. While illustrated as occupying a heel portion of the insole 560, the mechanical portion 810 can be implemented in other configurations.

Figure 9:
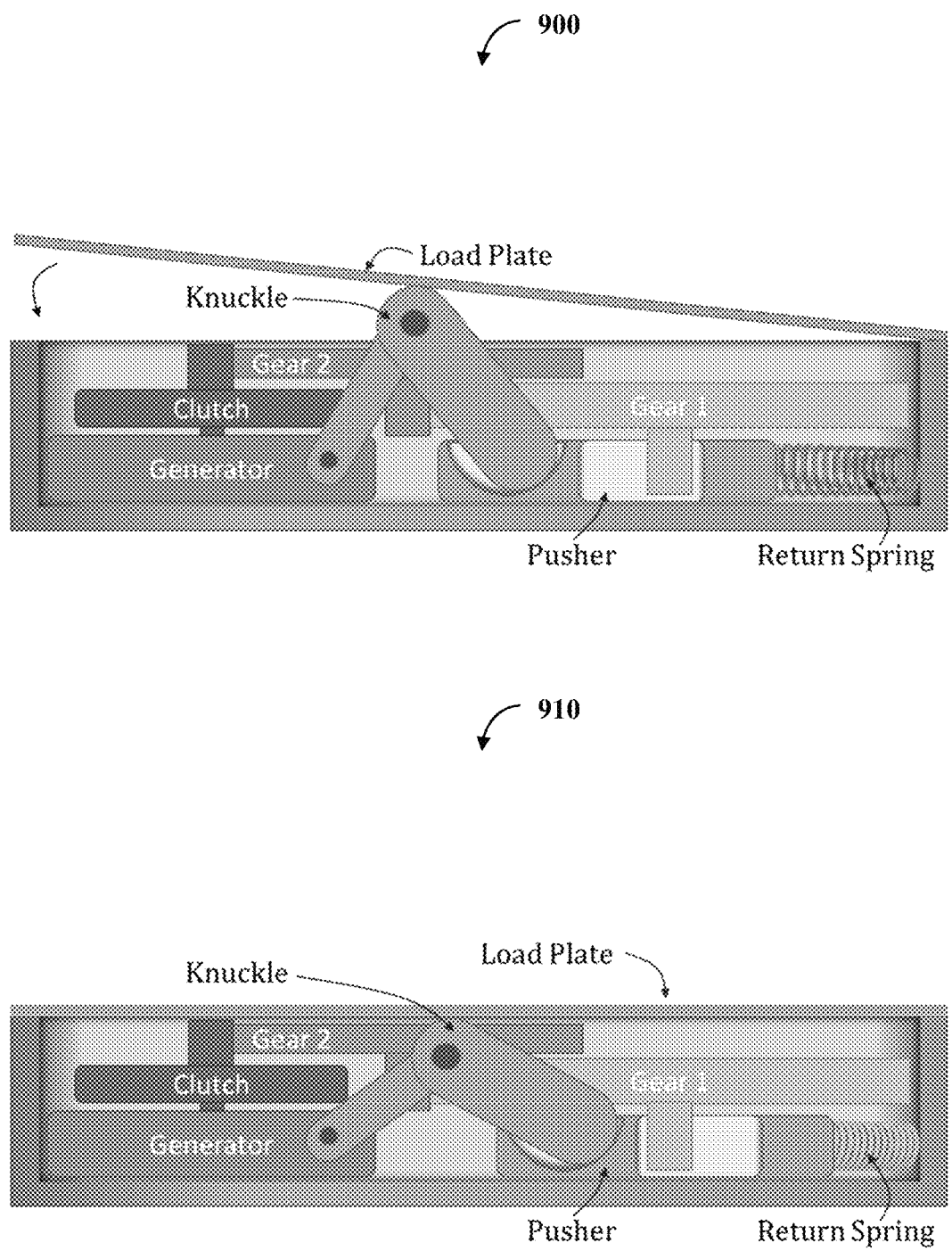
FIG. 9 illustrates two embodiments of the mechanical portion—a pre-heel strike embodiment and a post-heel strike embodiment.

FIG. 9 illustrates two embodiments of the mechanical portion 810 of FIG. 8—a pre-heel strike embodiment 900 and a post-heel strike embodiment 910. A knuckle can be used to convert linear motion, such as converting a north-to-south motion (superior to inferior) to east-to-west motion (anterior to posterior). A user places pressure on a load plate and the load plate pushes down the knuckle. The knuckle connects to a pusher that rotates a gear set (e.g., the gear set can function as the coupling mechanism 730 of FIG. 7 or as a rotational mechanism). The pusher can be the rack 570 of FIG. 5 and the pinion gear 580 of FIG. 5 that directly couples with a gear of the gear set such that the coupled gear rotates. While shown as two gears, more or less gears can be used for the gear set.

The knuckle and pusher can function, as an example, as a conversion component configured to convert a force of a heel strike sequence on a shoe insole into a rotational motion of a rotational mechanism (e.g., the gear set). The pusher can be countered by a return spring. The return spring can force the knuckle back to an upright position to receive another north-to-south motion and return the rack 570 of FIG. 5 (while counter-rotating the pinion 580 of FIG. 5). The return spring can be calibrated such that it provides little resistance to the pusher so as not to cause a great force against the rotation, but with enough resistance to return the knuckle. With this, the pusher can linearly move from a neutral position (e.g., heel) to an off-neutral position (e.g., toe) for the north-to-south motion (e.g., heel strike sequence) and for the south-to-north motion (e.g., heel lift sequence) the pusher can move linearly from the off-neutral position to the neutral position. The pusher can cause the gear set to rotate and this rotation can cause a generator to produce electricity.

A clutch can engage the rotational mechanism with the generator such that the electrical generator experiences rotation from the rotational motion of the mechanism. The clutch can function such that engagement occurs after a start of, but before an end of, the north-to-south motion. With this, the rotational movement causes a rotation of an electrical generator during less than a full duration of the heel strike sequence.

For the heel strike sequence, in view of conservation of energy, only so much energy is available. The more energy used to rotate the generator, then the less energy available for mechanical rotation. With this, the generator can function as a source of damping for the mechanical rotation and produce more counter-torque for the mechanical rotation. It can also be considered that it takes more force to overcome resting inertia than continuing movement for the mechanical rotation. In view of this, the circuit 740 of FIG. 7 can function such that initially gear 2 is not engaged with the generator. Without the generator connected electrically to a circuit, the generator is not a source of damping for mechanical rotation. When the resting inertia is overcome, the circuit 740 of FIG. 7 can cause the generator to be engaged electrically. In one embodiment, the generator can function as a flywheel to manage when to engage.

Figure 10:
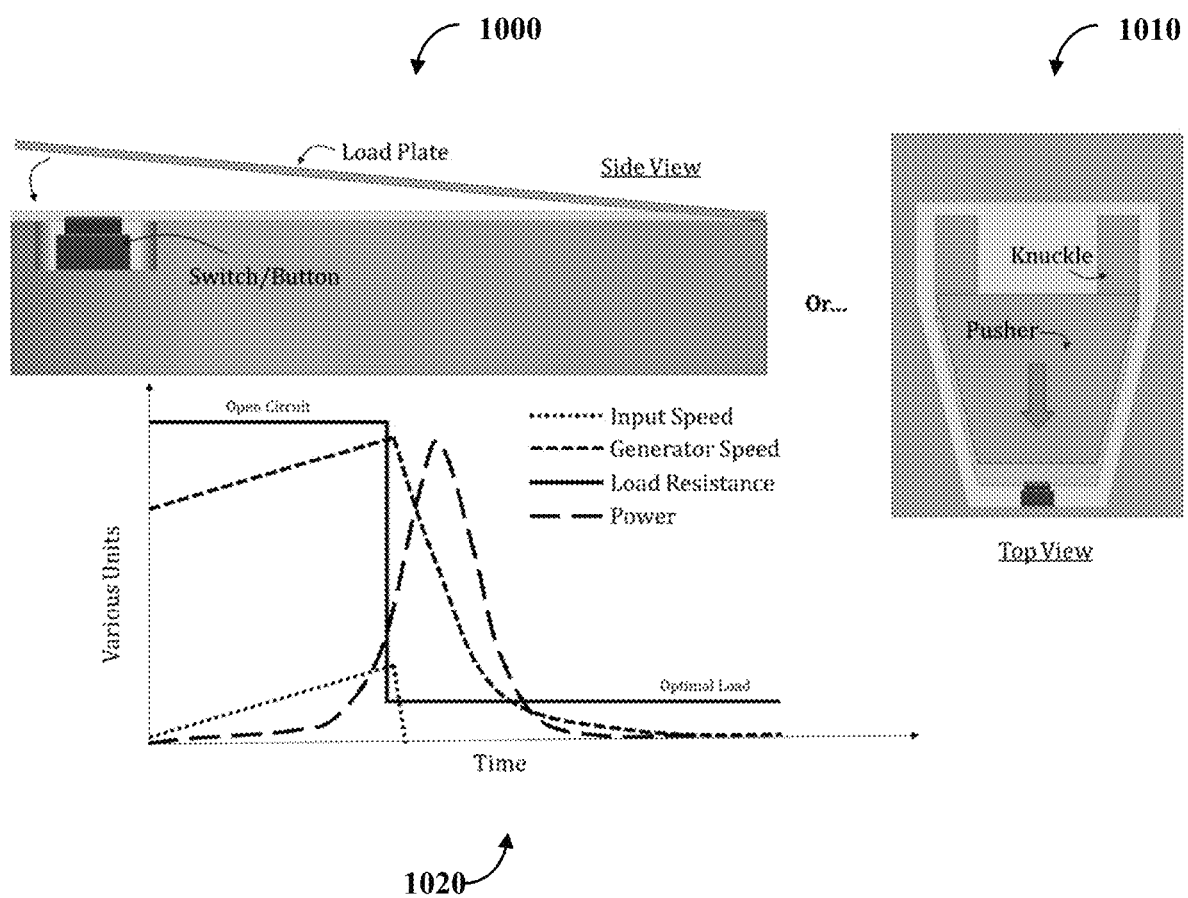
FIG. 10 illustrates one embodiment a first switch/button configuration, a second switch/button configuration, and a graph.

FIG. 10 illustrates one embodiment a first switch/button configuration 1000, a second switch/button configuration 1010, and a graph 1020. In one embodiment the configuration 1000 is a side view and the configuration 1010 is a top view of a single implementation. The circuit 740 of FIG. 7 can be operated by a button or a switch. The load plate can push down the knuckle as seen in FIG. 9. Pushing down on the knuckle can cause rotation of the gear set seen in FIG. 9. However, until the button is pressed the circuitry 740 of FIG. 7 does not engage with the generator. As the load plate nears touching the insole, the button can be pressed engaging the generator when at increase speed (e.g., maximum speed) to cause electrical current flow. Electrical energy generation can be increased (e.g., maximized) when generator speed is increased.

With this, the insole can comprise a harvesting circuit. The button or switch (e.g., circuit completion hardware switch) can cause the harvesting circuit to be open at the start of the heel strike step sequence. Once the switch is engaged by the load plate, the harvesting circuit closes so that the harvesting circuit is closed at the end of the heel strike step sequence. This closes circuit can cause the generator to rotate.

In the configuration 1000, the button is near the load plate. In the configuration 1010, the button is at a toe-side of the insole. The graph 1020 gives a qualitative illustration of how the relationship and timing of the Input Speed, Generator Speed, Load Resistance, and Power relate with the switch/button.

Figure 11:
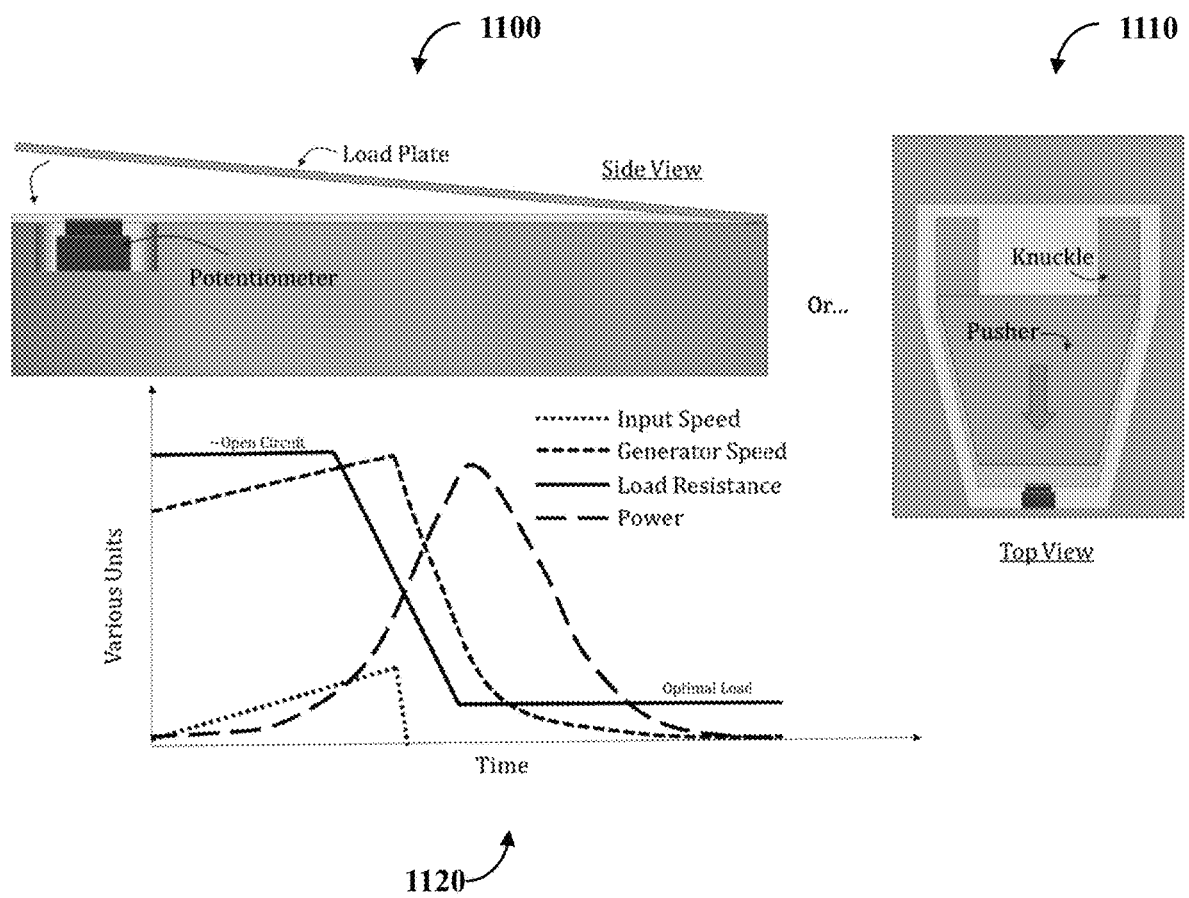
FIG. 11 illustrates one embodiment a first potentiometer configuration, a second potentiometer configuration, and a graph.

FIG. 11 illustrates one embodiment a first potentiometer configuration 1100, a second potentiometer configuration 1110, and a graph 1120. In one embodiment the configuration 1100 is a side view and the configuration 1110 is a top view of a single implementation. FIG. 11 is similar to FIG. 10, except instead of the switch/button a potentiometer is employed. The potentiometer can have a changeable value such that at the start of the heel strike step sequence the harvesting circuit associated with the generator functions similar to an open circuit. Similarly, the changeable value at the end of the heel strike step sequence can be such that the harvesting circuit associated with the electrical generator functions similar to a closed circuit. A controller component can manage changing the value of the potentiometer as well as identifying when to make the change. In one example, the controller component can be implemented as the load plate or the pusher (see FIG. 9). The change in potentiometer resistance value can be actuated by an interaction with the load plate, as in the configuration 1100, or by interaction with the pusher, as in the configuration 1110.

Figure 12:
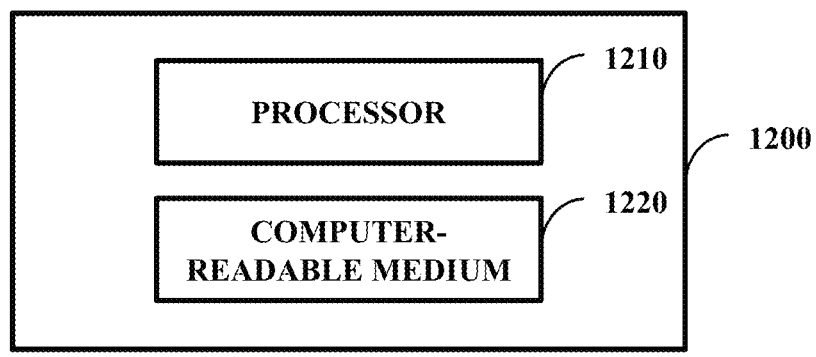
FIG. 12 illustrates one embodiment of a system comprising a processor and a computer-readable medium.

FIG. 12 illustrates one embodiment of a system 1200 comprising a processor 1210 and a computer-readable medium 1220 (e.g., non-transitory computer-readable medium). In one embodiment, the computer-readable medium 1220 is communicatively coupled to the processor 210 and stores a command set executable by the processor 1210 to facilitate operation of at least one component disclosed herein (e.g., the design component 610 of FIG. 6). In one embodiment, at least one component disclosed herein (e.g., the controller component discussed in the previous paragraph) can be implemented, at least in part, by way of non-software, such as implemented as hardware by way of the system 1200. In one embodiment, the computer-readable medium 1220 is configured to store processor-executable instructions that when executed by the processor 1210, cause the processor 1210 to perform at least part of a method disclosed herein (e.g., at least part of one of the method 1300 discussed below).

Figure 13:
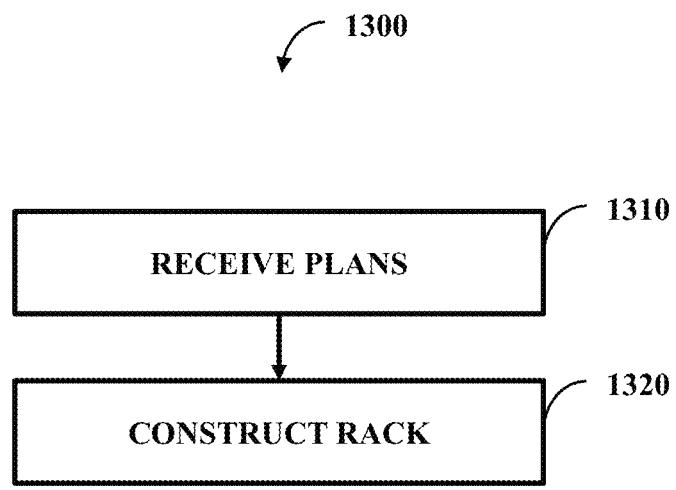
FIG. 13 illustrates one embodiment of a method with two actions.

FIG. 13 illustrates one embodiment of a method 1300 with two actions 1310 and 1320. At 1310, a plan can be received on how to build the rack. As an example, a rack designer can design an opening for the rack based on a specific pinion gear. In response to this, at 1320, the rack can be constructed. This construction can comprise controlling a machine to hollow out a piece of metal.

Figure 14:
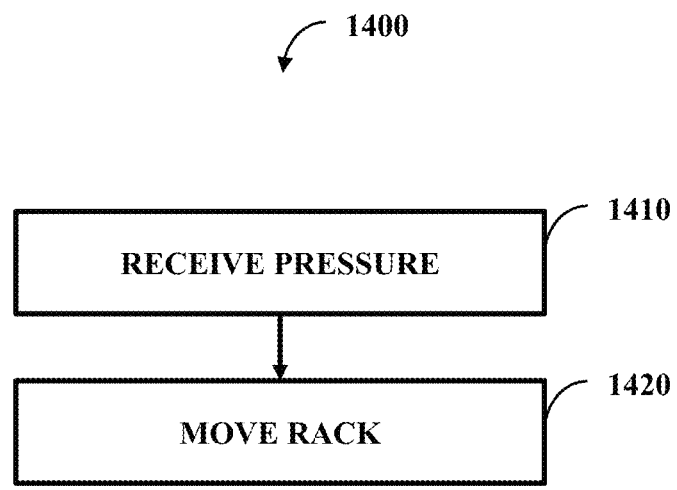
FIG. 14 illustrates one embodiment of a method with the actions.

FIG. 14 illustrates one embodiment of a method 1400 with the actions 1410 and 1420. The actions 1410 and 1420 can be performed by the insole 560 of FIG. 5. At 1410, the insole receives a pressure from a downward step. This downward step can be a heel strike (e.g., only a heel strike or an entire foot strike that includes the heel striking). In response to this pressure, at 1420, the rack 570 of FIG. 5 moves. This movement causes the pinion gear 580 of FIG. 5 to rotate and this rotation causes the electrical generator 710 of FIG. 7 to rotate (e.g., rotation of a disk or rod within a magnetic field).

This rotation of the pinion gear 580 of FIG. 5 can be about a half circular rotation. The pinion gear 580 of FIG. 5 can have a varied gear ratio value higher at a start of the rotation and lower at an end of the rotation. This start value can be a first value and the end value can be a second value. The second value can be equal to one over the first value ($2^{nd}$ value=$1/1^{st}$ value).

Figure 15:
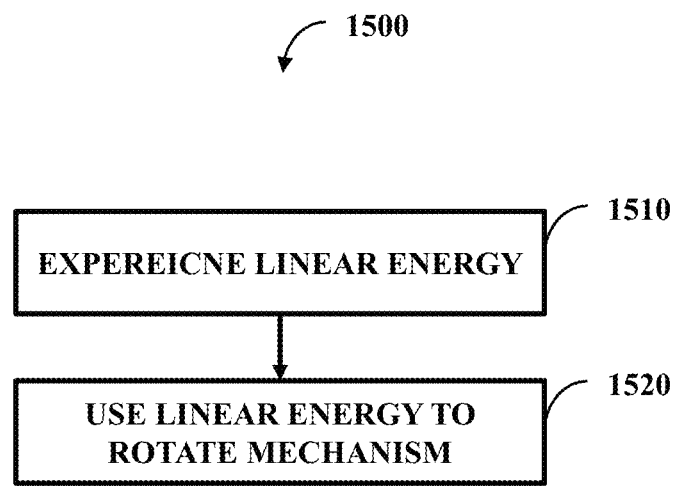
FIG. 15 illustrates one embodiment of a method comprising two actions.

FIG. 15 illustrates one embodiment of a method 1500 comprising two actions 1510 and 1520. The actions 1510 and 1520 can be performed by a shoe mechanism (e.g., the mechanical portion 810 of FIG. 8). At 1510, experiencing a linear energy that is resultant from a heel strike can occur. At 1520, there can be using the linear energy to rotate a rotational mechanism over a first time frame and a second time frame.

While the methods disclosed herein are shown and described as a series of blocks, it is to be appreciated by one of ordinary skill in the art that the methods are not restricted by the order of the blocks, as some blocks can take place in different orders.

What is claimed is:

1. A shoe insole, comprising:
a linear movement mechanism configured to make a linear movement from a neutral position to an off-neutral position during a heel strike sequence; and
a rotational movement mechanism, that is coupled to the linear movement mechanism, configured to make a rotational movement in response to the linear movement,
where the rotational movement causes a rotation of an electrical generator during less than a full duration of the heel strike sequence,
where the linear movement mechanism comprises a rack,
where the rotational movement mechanism comprises a pinion gear physically coupled to the rack,
where when the rack moves laterally, the pinion gear experiences a rotation,
where the pinion gear has a varied gear ratio,
where a varied gear ratio value of the pinion gear is lower at a start of the rotation experienced by the pinion gear, and
where the varied gear ratio value of the pinion gear is higher at an end of the rotation experienced by the pinion gear.

2. The shoe insole of claim 1, comprising:
the electrical generator,
where the electrical generator produces an electricity that powers a battery of a device associated with a wearer of the shoe insole.

3. The shoe insole of claim 2, comprising:
a circuit completion hardware configured to complete a circuit after a start of the heel strike sequence,
where the heal strike sequence causes the circuit to be completed by way of the circuit completion hardware and
where when the circuit is completed an interior of the electrical generator rotates and when the circuit is not completed the interior of the electrical generator does not rotate.

4. The shoe insole of claim 3,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

5. The shoe insole of claim 4,
where the pinion gear has a varied gear ratio,
where a varied gear ratio value of the pinion gear is lower at a start of the rotation experienced by the pinion gear, and
where the varied gear ratio value of the pinion gear is higher at an end of the rotation experienced by the pinion gear.

6. The shoe insole of claim 2, comprising:
a potentiometer configured to function at a first value and configured to function at a second value,
where the potentiometer is part of a circuit associated with the electrical generator,
where a start of the heel strike sequence the potentiometer is at the first value,
where after the start of the heel strike sequence the potentiometer is at the second value,
where the heel strike sequence causes the potentiometer to change from the first value to the second value,
where the first value is such that the circuit functions as an open circuit,
where the second value is such that the circuit functions as a closed circuit, and
where when the circuit is completed the rotational movement of the generator causes the damping of rotation of the electrical generator and when the circuit is not completed the rotational movement does not cause damping of the rotation of the electrical generator.

7. The shoe insole of claim 6,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

8. The shoe insole of claim 2,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

9. The shoe insole of claim 1,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

10. The shoe insole of claim 9,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

11. The shoe insole of claim 1, comprising:
a mechanical clutch,
where the rotational movement is a first rotational movement in a first mechanical direction,
where the linear movement is a first linear movement that is followed by a second linear movement,
where the second linear movement is a movement from the off-neutral position to the neutral position,
where, in response to the second linear movement, the rotational movement mechanism is configured to make a second rotational movement that is in a second mechanism direction that is a reverse direction to the first mechanism direction, and
where the mechanical clutch prevents the electrical generation from rotation in a reverse direction.

12. The shoe insole of claim 11,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

13. The shoe insole of claim 1, comprising:
a mechanical clutch,
where the rotational movement is a first rotational movement in a first mechanical direction,
where the linear movement is a first linear movement that is followed by a second linear movement,
where the second linear movement is a movement from the off-neutral position to the neutral position,
where, in response to the second linear movement, the rotational movement mechanism is configured to make a second rotational movement that is in a second mechanism direction that is a reverse direction to the first mechanism direction, and
where the mechanical clutch prevents the electrical generation from rotation in a reverse direction.

14. A shoe insole, comprising:
an electrical generator;
a linear movement mechanism configured to make a linear movement from a neutral position to an off-neutral position during a heel strike sequence;
a rotational movement mechanism, that is coupled to the linear movement mechanism, configured to make a rotational movement in response to the linear movement; and
a circuit completion hardware configured to complete a circuit after a start of the heel strike sequence,
where the rotational movement causes a rotation of the electrical generator during less than a full duration of the heel strike sequence,
where the electrical generator produces an electricity that powers a battery of a device associated with a wearer of the shoe insole,
where the heal strike sequence causes the circuit to be completed by way of the circuit completion hardware,
where when the circuit is completed an interior of the electrical generator rotates and when the circuit is not completed the interior of the electrical generator does not rotate,
where the heel strike sequence terminates with a foot toward a ground for a shoe that retains the shoe insole,
where after the heel strike sequence ends a heel lift sequence occurs,
where during the heel lift sequence the linear movement mechanism linearly moves from the off-neutral position to the neutral position,
where the heel lift sequence causes the circuit to be open, and
where the electrical generator is not caused to be rotated due to the heel lift sequence.

15. The shoe insole of claim 14, comprising:
a potentiometer configured to function at a first value and configured to function at a second value,
where the potentiometer is part of the circuit,
where a start of the heel strike sequence the potentiometer is at the first value, where after the start of the heel strike sequence the potentiometer is at the second value,
where the heel strike sequence causes the potentiometer to change from the first value to the second value,
where the first value is such that the circuit functions as an open circuit,
where the second value is such that the circuit functions as a closed circuit,
where when the circuit is completed, the rotational movement of the generator causes the damping of rotation of the electrical generator, and
where when the circuit is not completed, the rotational movement does not cause damping of the rotation of the electrical generator.

16. The shoe insole of claim 14,
where the linear movement mechanism comprises a rack,
where the rotational movement mechanism comprises a pinion gear physically coupled to the rack,
where when the rack moves laterally, the pinion gear experiences a rotation, and
where the rack and pinion gear are inline.

17. The shoe insole of claim 14,
where the heel strike sequence terminates with a foot toward a heel of a shoe that retains the shoe insole,
where after the heel strike sequence ends a heel lift sequence occurs,
where during the heel lift sequence the linear movement mechanism linearly moves from the off-neutral position to the neutral position,
where the heel lift sequence causes the circuit to be open, and
where the electrical generator is not caused to be rotated due to the heel lift sequence.

18. The shoe insole of claim 14, comprising:
a mechanical clutch,
where the rotational movement is a first rotational movement in a first mechanical direction,
where the linear movement is a first linear movement that is followed by a second linear movement,
where the second linear movement is a movement from the off-neutral position to the neutral position,
where, in response to the second linear movement, the rotational movement mechanism is configured to make a second rotational movement that is in a second mechanism direction that is a reverse direction to the first mechanism direction, and
where the mechanical clutch prevents the electrical generation from rotation in a reverse direction.

19. A shoe insole, comprising:
an electrical generator;
a linear movement mechanism configured to make a linear movement from a neutral position to an off-neutral position during a heel strike sequence;
a rotational movement mechanism, that is coupled to the linear movement mechanism, configured to make a rotational movement in response to the linear movement;
a potentiometer configured to function at a first value and configured to function at a second value,
where the potentiometer is part of a circuit associated with the electrical generator,
where a start of the heel strike sequence the potentiometer is at the first value,
where after the start of the heel strike sequence the potentiometer is at the second value,
where the heel strike sequence causes the potentiometer to change from the first value to the second value,
where the first value is such that the circuit functions as an open circuit,
where the second value is such that the circuit functions as a closed circuit,
where when the circuit is completed, the rotational movement of the generator causes the damping of rotation of the electrical generator,
where when the circuit is not completed, the rotational movement does not cause damping of the rotation of the electrical generator,
where the rotational movement causes a rotation of the electrical generator during less than a full duration of the heel strike sequence,
where the electrical generator produces an electricity that powers a battery of a device associated with a wearer of the shoe insole
where the heel strike sequence terminates with a foot toward a heel of a shoe that retains the shoe insole,
where after the heel strike sequence ends a heel lift sequence occurs,
where during the heel lift sequence the linear movement mechanism linearly moves from the off-neutral position to the neutral position,
where the heel lift sequence causes the circuit to be open, and
where the electrical generator is not caused to be rotated due to the heel lift sequence.

20. The shoe insole of claim 19, comprising:
a circuit completion hardware configured to complete the circuit after a start of the heel strike sequence,
where the heal strike sequence causes the circuit to be completed by way of the circuit completion hardware, and
where when the circuit is completed an interior of the electrical generator rotates and when the circuit is not completed the interior of the electrical generator does not rotate.

* * * * *